United States Patent [19]

Chan

[11] Patent Number: 4,545,242

[45] Date of Patent: Oct. 8, 1985

[54] METHOD AND APPARATUS FOR MEASURING THE DEPTH OF A TOOL IN A BOREHOLE

[75] Inventor: David S. K. Chan, Bethel, Conn.

[73] Assignee: Schlumberger Technology Corporation, New York, N.Y.

[21] Appl. No.: 437,059

[22] Filed: Oct. 27, 1982

[51] Int. Cl.[4] ............................................. E21B 49/00
[52] U.S. Cl. ...................................... 73/152; 340/853; 367/81
[58] Field of Search ............... 73/152, 151; 33/125 R, 33/312; 340/853; 367/81

[56] References Cited

U.S. PATENT DOCUMENTS

| | | | |
|---|---|---|---|
| 3,490,149 | 1/1970 | Bowers | 73/151 X |
| 3,490,150 | 1/1970 | Whitfill | 73/151 X |
| 3,862,499 | 1/1975 | Isham | 33/312 |
| 3,882,474 | 5/1975 | Cain | 340/853 X |
| 4,348,748 | 9/1982 | Clavier et al. | 367/25 |
| 4,362,054 | 7/1982 | Ringot | 73/152 |

OTHER PUBLICATIONS

"The High Resolution Dipmeter Tool", by L. A. Allaud and J. Ringot, reprinted from The Log Analyst, May–Jun., 1969.
"Optimal Linear Filtering", reprinted from Applied Optimal Estimation, edited by A. Gelb and published by M.I.T. Press, Cambridge, Mass., 1974.

Primary Examiner—John W. Caldwell, Sr.
Assistant Examiner—Ellwood G. Harding
Attorney, Agent, or Firm—Louis H. Reens; Stephen Borst; David Carroll

[57] ABSTRACT

A high resolution method and apparatus for measuring the depth of a tool suspended from a cable inside a borehole are described. The tool includes accelerometers for measuring its acceleration and this measurement is combined with a cable depth measurement with which the amount of cable in the borehole is determined. A Kalman filter is employed to continually provide estimates of the velocity and depth of the tool from the accelerometer and cable depth measurements. A filter modifier alters operation of the filter during discontinuous motions of the tool such as when it is stuck and slips. A tool sticking detector senses when the tool is stuck and for how long to correspondingly modify the filter by forcing it to more strongly rely upon accelerometer measurements when the tool is stuck and gradually return to normal filter operation when the tool resumes movement after having been stuck.

21 Claims, 9 Drawing Figures

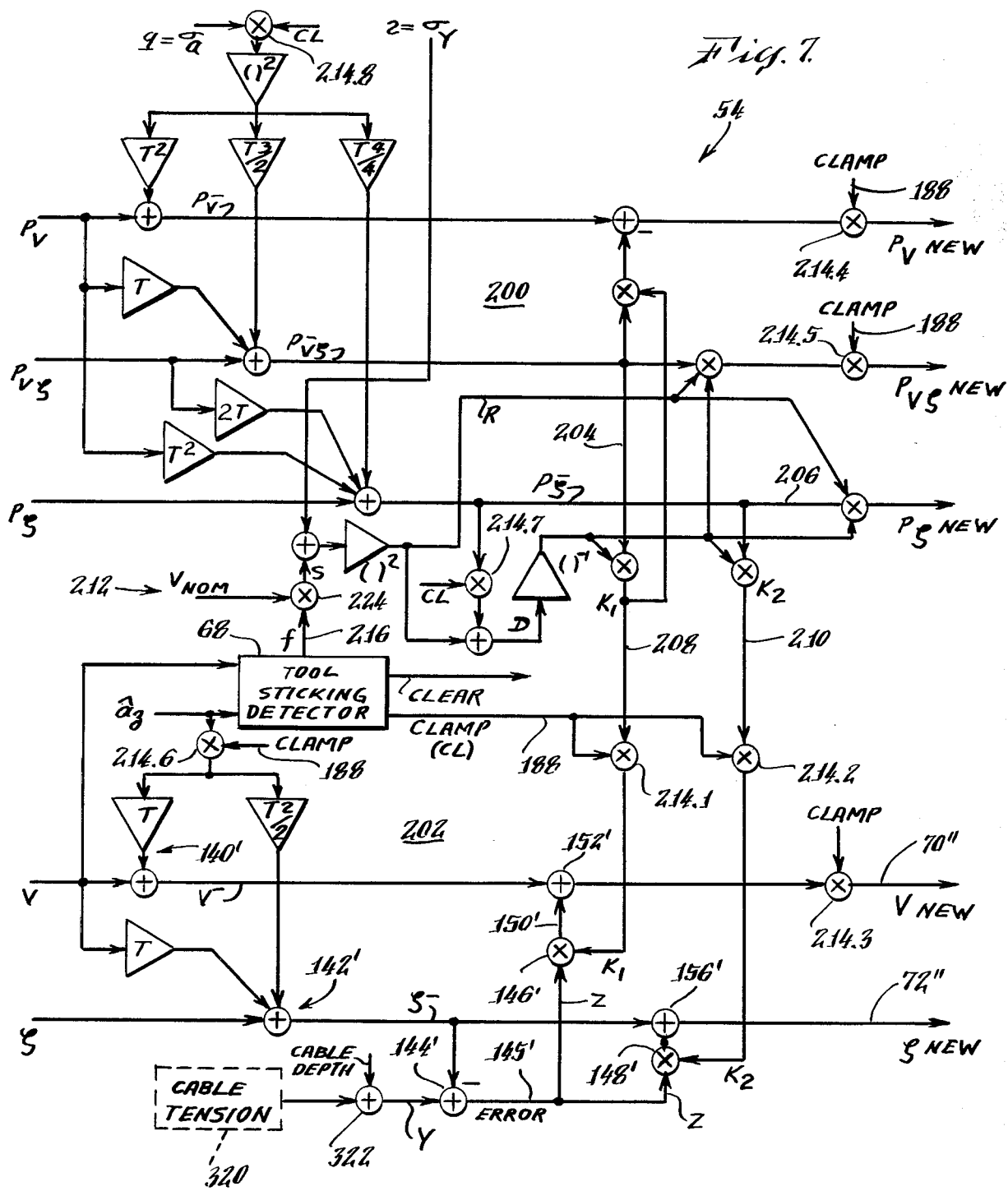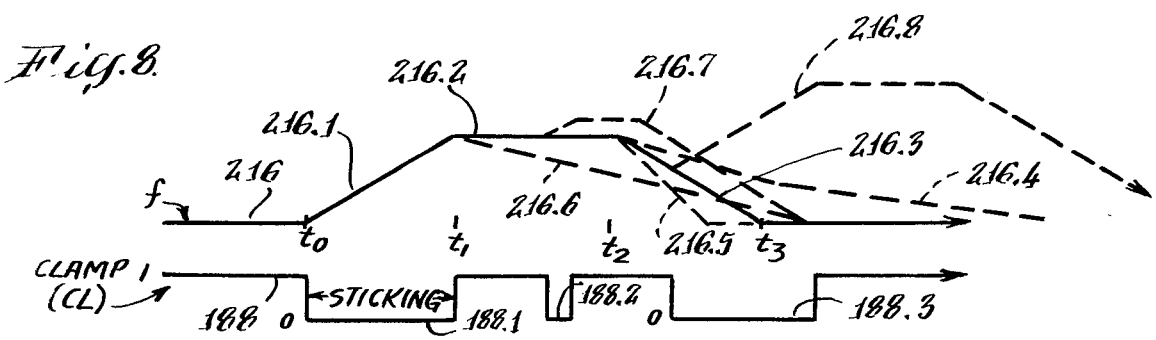

METHOD AND APPARATUS FOR MEASURING THE DEPTH OF A TOOL IN A BOREHOLE

FIELD OF THE INVENTION

This invention relates to an investigation of an earth formation from a borehole. More specifically, this invention relates to a method and apparatus for determining the depth of a tool suspended from a cable inside the borehole.

BACKGROUND OF THE INVENTION

In the field of well logging with a tool that is suspended from a cable, accurate information of the depth of the tool is difficult to obtain because the tool tends to bounce up and down as the cable is drawn up the borehole. This is an effect often referred to as "yo-yo" and renders depth correlation of high resolution information inaccurate. Such problem is particularly severe in pad-type tools and deviated wells where the friction sometimes is sufficiently great to stop the tool completely which then races ahead as tension built up in the cable overcomes the static friction. The sticking and slipping and the yo-yo motion of the tool, if not compensated for, can lead to erroneous and misleading results on logs produced by high resolution earth formation investigations from inside a borehole.

For example, in a high resolution dipmeter took with which the angles of beddings are to be determined, errors in the tool speed, or more properly depth, translate directly into errors in computed dips and at times are severe enough to prevent a dip determination altogether. This problem has been well recognized as, for example, described in an article entitled "The High Resolution Dipmeter Tool" by L. A. Allaud and J. Ringot and published in "The Log Analyst" of May--June 1969. The solution proposed in this article involves a pair of electrodes that are vertically spaced from each other by a known distance and assuming these electrodes pass over the same track on the borehole wall, the responses of the electrodes should yield the same current response except for a displacement proportional to the spacing between the electrodes. Tool velocity can be estimated by cross-correlating segments of current measurements from the two electrodes. This technique works well when the tool rotates but slowly with good pad contact with the borehole wall and provided that speed variations about the average are not severe. However, when speed variations are large, such as when the tool motion is jerky (stick and slip), or when the measurement curves from the two electrodes fail to resemble each other sufficiently to correlate well, then this technique does not work well.

Although compensation for tool yo-yo has often been referred to as a speed correction problem, in practice it is a correction of the tool depth measurement made by monitoring the motion of the cable from which the tool is suspended. An improvement in a determination of depth has been obtained by use of accelerometers used to both measure tool acceleration and the tool's inclination relative to the local vertical. This technique employs accelerometers and causes inaccuracies in the depth determination attributable to an assumption that the cable measured depth represents true tool depth at regular depth intervals. This assumption, however, is not consistently correct, particularly because it fails to take tool jerking motions into account at boundaries of such intervals. Furthermore, although in theory accelerometers can yield an accurate determination of depth by use of well known integration techniques, errors in the accelerometer measurements eventually accumulate to significant values, thus requiring periodic updating or correction with other measurements.

SUMMARY OF THE INVENTION

With a method and apparatus in accordance with the invention, the depth of a tool suspended from a cable can be measured with a resolution comparable with that needed for the use of high resolution investigations of an earth formation from inside a borehole. This is obtained by employing a filter with which estimates of tool depth are made and continually updated with current measurements of the cable depth and with the detection of discontinuous motions of the tool such as when it is stuck.

As described herein for one form of a tool depth sensor in accordance with the invention, a tool which is suspended from a cable in a borehole carries devices to measure the acceleration of the tool along the borehole axis and the inclination angle of the axis relative to the local vertical. A measurement is made of the cable length inside the borehole and these measurements are applied to a filter of the Kalman type. The filter generates estimates of the depth and velocity of the tool from these measurements and estimates error variance for these parameters. A filter modifier is employed to alter operation of the filter when tool sticking occurs. The filter modifier employs a tool sticking detector to generate appropriate signals for controlling the Kalman filter both during the time the tool is stuck and for some time subsequent thereto for a gradual transition to normal filter operation.

Discontinuous motions of the tool are detected by monitoring the acceleration measurement and determining when certain conditions for a stuck tool are met. The determination of a stuck tool causes the generation of a filter modifying signal whereby certain estimates of the filter are forced to values which must exist when the tool is not moving, such as the velocity and its error variance estimate are set to zero and the extent of the dependency of the filter upon the cable depth measurement curtailed.

While the tool is stuck a function signal is generated whose value is related to the duration that the tool is stuck. The function signal is then employed to gradually return operation of the filter to a steady state condition after the tool resumes its motion.

The detection of intermittent tool motion advantageously enables alteration of the Kalman filter so as to adapt it to changing borehole conditions. When the accelerometer data identifies a motionless tool interval, the velocity estimate and its error variance are forced to zero and the feedback loop normally employed in the Kalman filter is disabled so that the tool depth estimate remains at a constant value.

While the tool is stuck the cable depth measurement can be expected to be in error by an amount that increases in proportion to the duration that the cable is stretched while the tool is stuck. This error is proportional to the nominal velocity of the tool as measured by monitoring the cable depth at the surface. A tool depth sensor in accordance with the invention accommodates the error in the cable depth measurement by modifying the normally constant cable depth variance by an amount that is a function of the interval the tool was stuck. This advantageously enables a more precise identification of the cable depth variance when the tool is experiencing little yo-yo, without impairing performance of the filter when errors are large due to tool sticking.

With a technique in accordance with the invention for measuring the depth of a tool, greater trust is placed in the cable depth measurement when the tool is not sticking, while more reliance upon accelerometer measurements are made during the tool stick and slip conditions so that an accurate high resolution estimate of tool depth is obtained.

It is, therefore, an object of the invention to provide a method and apparatus that enable an accurate determination of tool depth throughout diverse borehole conditions such as when the tool sticks and slips. It is a further object of the invention to adapt a Kalman filter to borehole conditions to obtain precise estimates of the depth of a tool from inside a borehole which penetrates an earth formation. These and other advantages and objects of the invention can be understood from the following description of one embodiment of the invention as described in conjunction with the drawings.

BRIEF DESCRIPTION OF DRAWINGS

FIG. 7 is a block diagram of a digital implementation of a filter employed in the tool depth sensor of FIG. 6;

FIG. 8 is a timing diagram for signals generated with a tool discontinuous motion detector used in a tool depth sensing system in accordance with the invention;

DETAILED DESCRIPTION OF DRAWINGS

Figure 1:
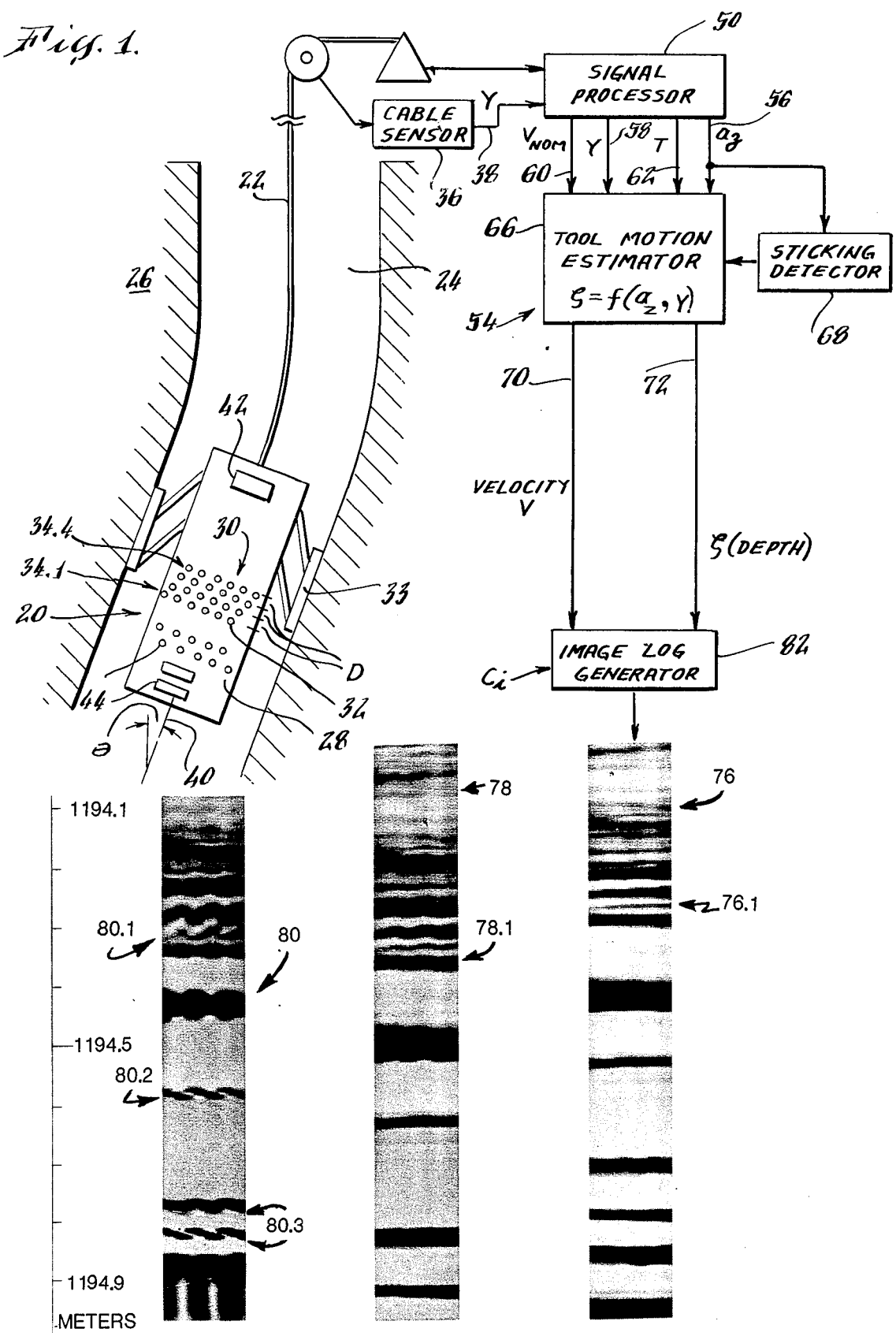
FIG. 1 is a schematic block diagram and partial display of a system in accordance with the invention for deriving an accurate measurement of the depth of a tool employed in the investigation of an earth formation from inside a borehole.

With reference to FIG. 1, a tool 20 is shown suspended from a cable 22 in a borehole 24 penetrating an earth formation 26. Tool 20 includes a segment 28 on which an array 30 of survey electrodes 32 are placed in a manner as more particularly described in copending patent applications entitled "Method And Apparatus For Electrically Investigating A Borehole" filed by Gianzero et al on July 30, 1981 bearing Ser. No. 288,544 and "Method And Apparatus For Investigating Stand-Off In A Borehole" filed by Ekstrom et al on Mar. 24, 1982, bearing Ser. No. 361,224; both of said applications being assigned to the same assignee as for this invention and which are incorporated herein by reference thereto. The tool segment 28 is adapted to be pressed against the wall of borehole 24 for close operation between the array 30 of survey electrodes 32 and the earth formation 26. The segment 28 may be part of tool 20 or individual pads, such as 33 that are urged against the wall of the borehole 24.

The array 30 is formed of rows 34 of electrodes 32 which are laterally so displaced that as the tool 20 is pulled up by cable 22 during an investigation, the array of electrodes investigates overlapping locations of the earth formation 26. In this manner an effectively vertically and circumferentially contiguous segment of the earth formation is investigated with a high resolution, of the order of millimeters.

The electrodes 32 are in the shape of circular buttons and the rows 34, although close to each other, are spaced by small distances D. The electrodes 32 may have a diameter such as about five millimeters and the separation D between rows 34 may be of a comparable dimension of about a cm. The survey currents of the buttons 32 are sampled for the entire array 30 and the measurements of rows 34 related to a common depth are assembled, such as in a signal processor memory, by depth shifting to form a "single row" of samples as if all of the electrodes in the array 30 had been along such single row. The depth shifted samples are of button currents injected into overlapping earth formation locations along the single row. The number of earth formation locations investigated in the circumferential direction is, by virtue of the electrode spacings, equal to the number of electrodes in the array 30. The frequency of electrode sampling is selected sufficiently high so as to assure sufficient sampling during the highest expected velocities of tool 20. The depth shifting of samples from the respective rows 34 produces the desired high circumferential resolution investigation of the order of 2.5 mm.

Tool 20 is drawn up by cable 22 with surface located equipment where a sensor 36 is employed to measure the paid-out length of the cable as well as its motion and thus provide a depth measurement, y, on line 38 of the depth of tool 20. The cable 22 elongates as a function of depth of tool 20 and this is taken into account in the depth measurement. On the average the velocity of tool 20 is equal to the sensed cable velocity. In practice, however, tool 20 oscillates up and down much like a yo-yo and in case of a pad or wall engaging tool is partiicularly prone to get stuck for a moment and then race ahead as tension in cable 22 overcomes the sticking force on tool 20.

Tool 20, therefore, includes local means for sensing the acceleration of the tool along the borehole axis 40 or z. The acceleration of tool 20 is sensed with orthogonally oriented accelerometers 42 whose output signals are employed in a well known manner to determine the acceleration, $a_z$, of tool 20 along the borehole axis 40. The acceleration signals are also employed to derive the inclination angle of the borehole axis 40 relative to the local vertical. Determination of the inclination angle $\theta$ may be done in a manner as described, and incorporated by reference thereto, in a copending patent application entitled "Method And Apparatus For Determining Direction Parameters Of A Continuously Explored Borehole", filed by Jean Ringot on Sept. 22, 1980 bearing Ser. No. 189,421 and assigned to the same assignee as for this invention. U.S. Pat. No. 4,348,748 describes another technique to measure the borehole inclination angle.

Tool 20 is also shown provided with acoustic transducers such as 44 and a pair of calibration acoustic $G(n) = \sqrt{G_x^2(n) + G_y^2(n) + G_z^2(n)}$ is computed and averaged to derive g. Tool acceleration $a_z(n)$ along the borehole axis, z, is determined by the relationship $a_z(n) = G_z(n) - g \cos \theta$ where $\theta$ is derived from an averaging of the three axes accelerometer measurements.

The tool acceleration value $a_z(n)$ on line 56 is applied to a Kalman filter 122, with which estimates of the tool motion and depth are generated, and to tool sticking detector 68 as well as to an initial condition estimator 124 whose outputs 126, 128 present estimates of initial values for tool velocity $V(n_o)$ and tool depth, $\zeta(n_o)$ for use by filter 122. The cable depth signal y(n) at 58 is applied as an input to estimator 124 and filter 122 for deriving current values of tool velocity V(n) at 70 and tool depth $\zeta(n)$ at 72.

Figure 4:
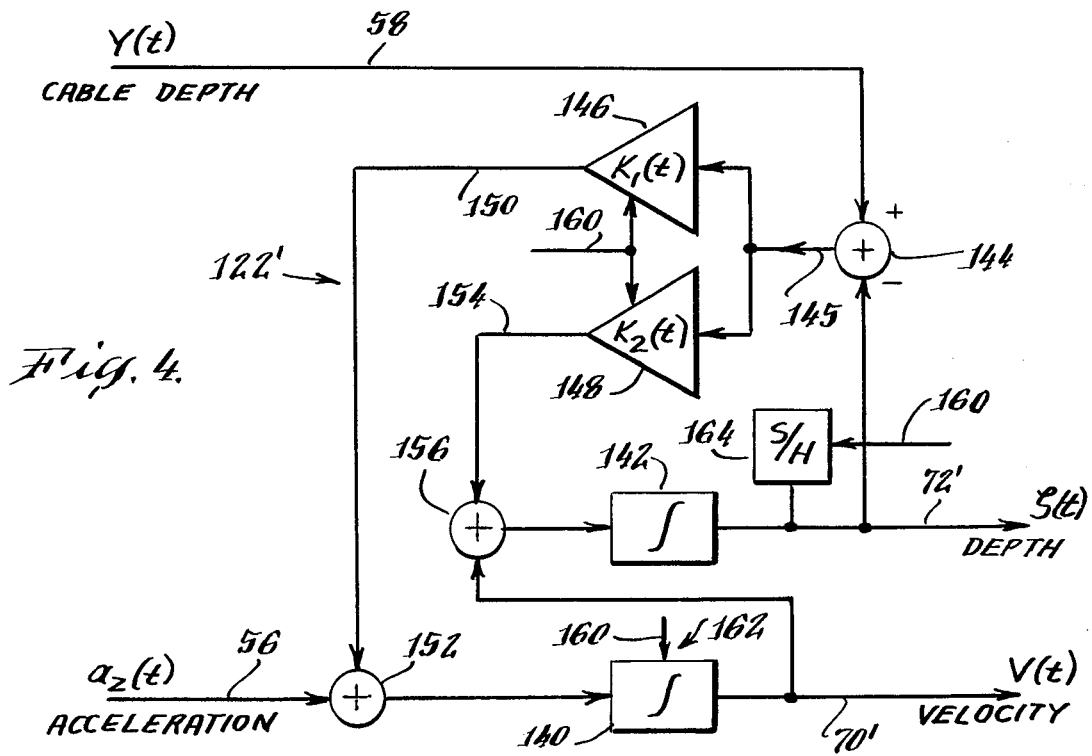
FIG. 4 is a block diagram of a filter for use in the tool depth sensor of FIG. 3.

The Kalman filter 122 generally is of a type as generally described in a book publication entitled "Applied Optimal Estimation" edited by A. Gelb and published by M.I.T. Press, Cambridge, Mass. 1974 and which is incorporated herein by reference thereto. With particular reference to the chapter "Optimal Linear Filtering" in the latter book and FIG. 4.2-3 therein, a recursive discrete filter is described with a simplified computer flow diagram of such filter being shown in FIG. 4.2-3. In this invention the Kalman filter 122 produces a model of the tool motion and updates estimated values with measurements. FIG. 4 herein illustrates a continuous version of a Kalman filter 122' used to derive tool velocity V(t) and tool depth $\zeta(t)$ from a measured acceleration input $a_z(t)$ and cable depth y(t) with appropriate segments modified in accordance with the invention.

The acceleration measurement is integrated at 140 to produce the tool velocity estimate on line 70' which is applied to a second integrator 142 to derive the tool depth estimate on output 72'. These integrations are conventional for obtaining tool velocity and depth estimates from an acceleration measurement. The tool depth estimate is compared with the cable depth measurement y(t) in a combiner circuit 144 and the difference, cable depth error, on line 145 is fed back through amplifiers 146, 148 to modify the velocity and depth estimates. The amount of feedback is controlled by the gain factors $K_1(t)$ and $K_2(t)$ associated with the amplifiers 146, 148 respectively. The output 150 of amplifier 146 is combined with the acceleration measurement in summing network 152. The output 154 of amplifier 148 is combined with the velocity estimate in summing network 156.

The gain factors associated with amplifiers 146, 148 in effect reflect the relative confidence in the acceleration measurement $a_z(t)$ versus the cable depth measurement y(t). The more accurate the acceleration measurement is believed to be relative to cable depth, the smaller the feedback gains $K_1(t)$ and $K_2(t)$ tend to be and vice versa.

In tool depth estimator 54 the relative reliance upon these measurements is determined by the Kalman filter equations and then modified with tool sticking detector 68. The latter generates a filter modifying output which includes a modifier signal at output 160 that is applied to amplifiers 146, 148 to force their outputs and the velocity at 162 to zero in recognition that during sticking, the tool acceleration and velocity are zero. In addition, the tool sticking detector 68 causes the filter 122' to present a constant depth output by way of a sample and hold network 164 activated by the modifier signal 160. Hence, while the tool motion is discontinuous, such as during sticking, the filter dependence on erroneous cable depth y and acceleration $a_z$ inputs for deriving tool depth and velocity estimates is avoided.

Figure 5:
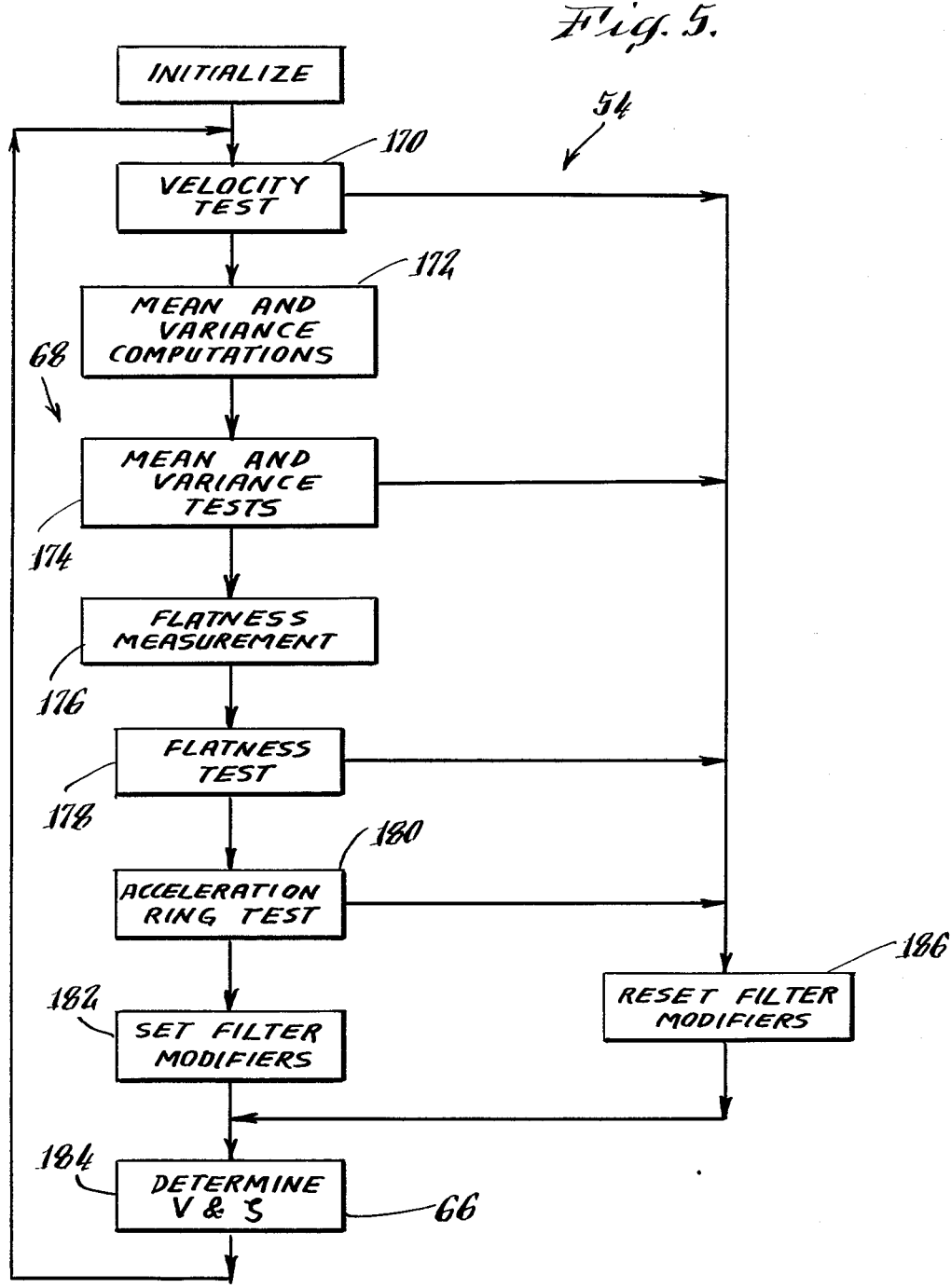
FIG. 5 is a block diagram for a tool sticking detector used in a tool depth sensor in accordance with the invention.

The tool sticking detector 68 is based on the observation that when tool 20 comes to a halt, the acceleration $a_z(n)$ initally increases rapidly towards zero from a sharp negative excursion and then exhibits some rapidly decaying ringing around zero. After that the value of $a_z(n)$ stays close to zero while the tool is stuck. Accordingly, the detector 68 as shown in FIG. 5 commences at 170 with a test of the velocity of the tool 20. This test is needed since zero acceleration could mean a constant tool speed rather than a stuck tool. The estimated velocity V of the tool is checked at 170 whether it is less than a maximum threshold and if so, the detector 68 continues its checks.

At 172 the mean and variance of the tool acceleration $a_z(n)$ within a window are measured and these values are compared at 174 against thresholds. If these are not exceeded, the detector 68 continues.

Figure 9:
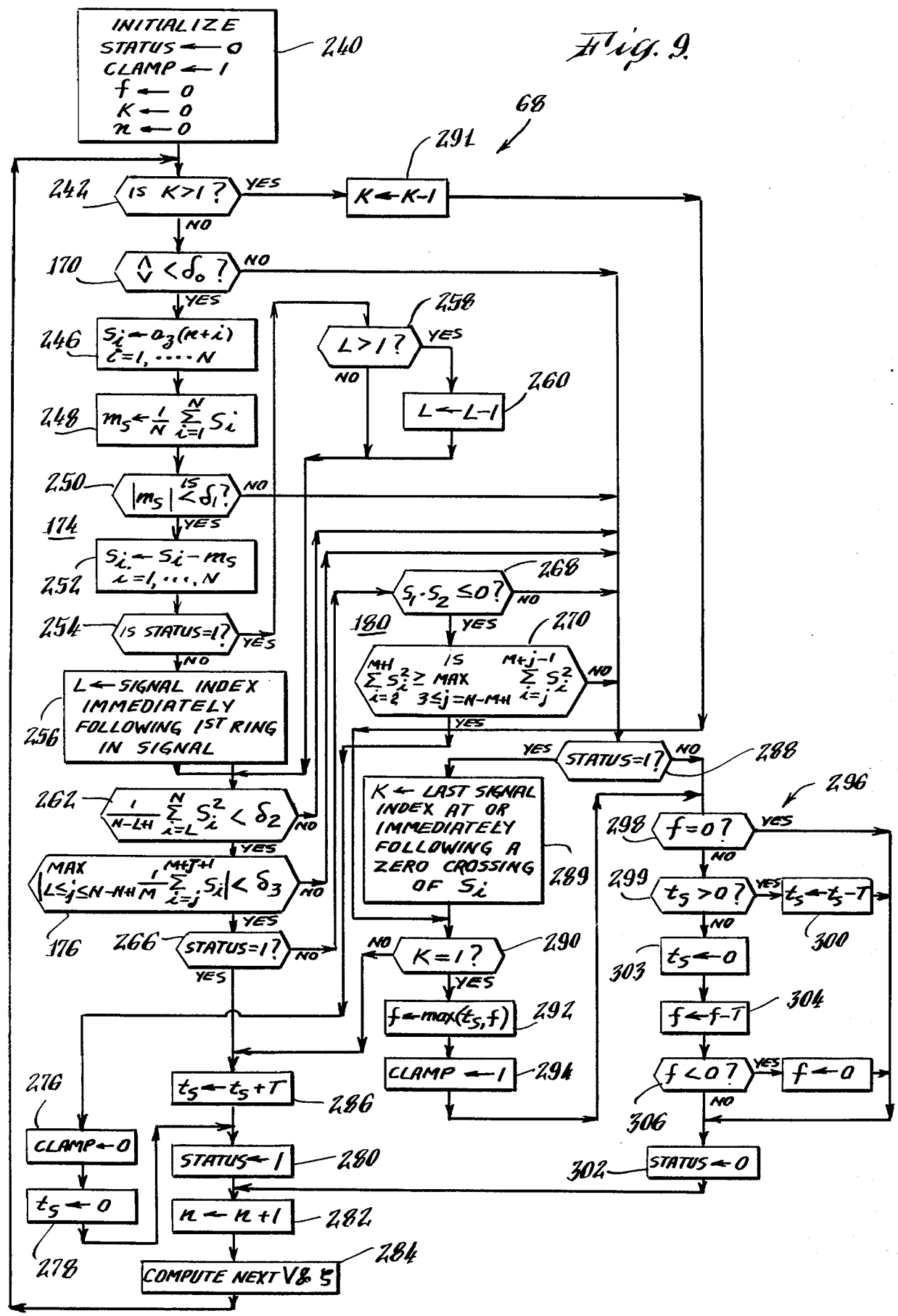
FIG. 9 is a flow chart of a discontinuous tool motion detector employed in a tool depth sensor in accordance with the invention.

A statistical "flatness" measurement, as more particularly described with reference to FIG. 9, is made at 176 and compared at 178 with a threshold. If the test is met, then at 180 the acceleration measurement $a_z(n)$ is examined for the onset of an initial ringing effect, an example of which is shown at 90.1 in FIG. 2. When all the tests are met, the tool 20 is determined to be stuck and certain values generated in the filter 122 are set to particular values at 182. New values for tool velocity V and tool depth $\zeta$ are then computed at 184 using the now modified filter 122 and the tool sticking detector 68 is then reentered. This continues until the tool resumes motion as sensed by the failing of any of the tests. The sensed resumption of motion causes a resetting of the filter modifiers at 186.

The setting of filter modifiers at 182 includes the application of a modifier signal 160 in FIG. 4 to force the gain factors $K_1$ and $K_2$ and the value of the velocity estimate to zero. The value of the tool depth $\zeta$ is held constant such as by clamping it to its last fixed value with sample and hold network 164.

The operation of the tool discontinuous motion detector 68 with a digital version of a filter 122 can be understood with reference to FIGS. 7 and 8. The Kalman filter 122 includes an error variance estimating segment 200 and a velocity V and tool depth $\zeta$ estimator segment 202. The error variance estimator 200 generates signals at 204 and 206 with which the gain factors $K_1$ and $K_2$, at 208 and 210 respectively, as previously described with reference to FIG. 4 are produced. The error variance estimator 200 estimates new error variances for velocity, $P_v$, depth, $P_\zeta$, and error covariance $P_{v\zeta}$ with the known variances for acceleration $a_z$ and cable depth y. Intermediate estimates of the error variances $P^-_v$ and $P^-_\zeta$ at 204 and 206 respectively are used to generate the values for $K_1$ and $K_2$. The velocity V and depth estimator 202 employs the values of $K_1$ and $K_2$ after combining with the difference between cable depth y and tool depth estimate $\zeta$ to generate new velocity V and depth $\zeta$ estimates.

Figure 6:
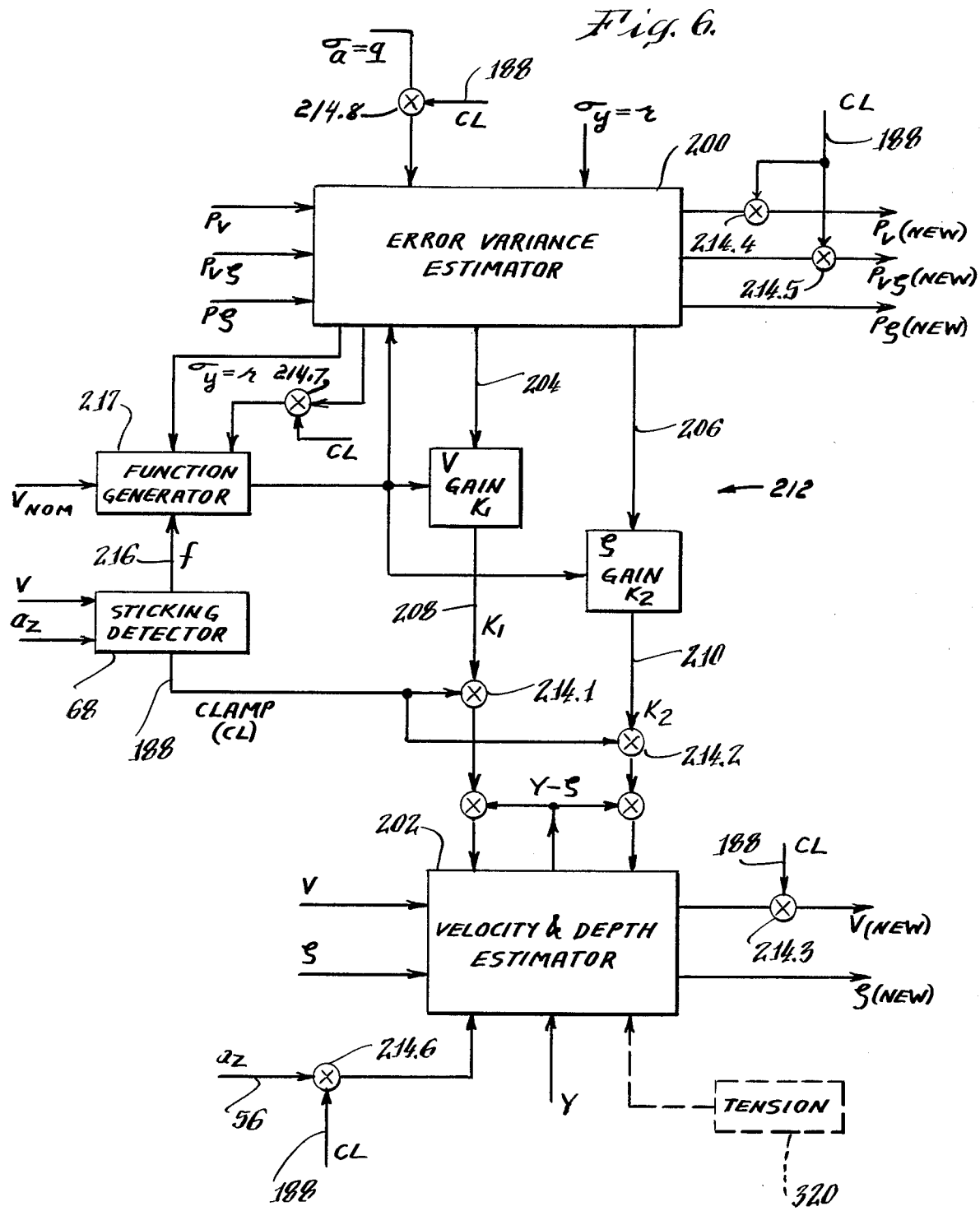
FIG. 6 is a block diagram of a filter adapted to borehole conditions in accordance with the invention for measuring the depth of a tool inside a borehole.

In the embodiment of FIG. 6 a filter modifier 212 operates to alter the values of $K_1$ and $K_2$ or their effect on the velocity and depth estimator 202 during tool sticking and for a period thereafter. The sticking of tool 20 is detected and the modifying signal 160 in the form of clamp signal 188 as shown in FIG. 8 is produced. The clamp signal 188 in this embodiment is used to force certain estimates and quantities to zero. This is done by assigning a value of zero at 188.1 during the time the transducers all as more particularly described in the above identified Ekstrom et al patent application. The data from the various sensors on tool 20 is telemetered uphole. The data may then be recorded for subsequent processing or the data may be entered directly into a signal processor 50. In the system of FIG. 1 the signal processor 50 is shown with a tool depth estimator 54 separately illustrated, though in practice such estimator 54 would be included in a signal processor such as 50.

The tool depth estimator 54 employs the borehole axis acceleration signal $a_z$ on line 56 derived from accelerometers 42, cable depth signal y on line 58, nominal cable velocity $V_{nom}$ on line 60 and time T on line 62. The nominal cable velocity may be a preset or constant value or derived from the cable depth measurement y. In the preferred form of the invention the tool depth is determined by using digital samples of the time, tool acceleration and cable sensor output. The sampling speed is selected sufficiently high so as to assure an accurate digital representation of these parameters.

The tool depth estimator 54 employs a digital filter, such as a Kalman filter, which develops an estimate of the tool motion and depth in a model for the tool motion and depth at 66. A tool motion analyzer 68 is employed to detect a stick and slip condition of the tool 20 as it is moved through the borehole 24. When such tool sticking is detected, the estimate of tool depth is altered so that a correct tool velocity signal V and tool depth signal $\zeta$ at 70, 72 respectively are obtained.

With a tool depth estimator 54 in accordance with the invention a sufficiently precise determination of tool depth can be made so that a high resolution earth formation investigation of the order of millimeters, as made, for example, with vertically spaced rows 34 of electrodes 32 can be depth shifted to common depth intervals without introducing significant errors. This can be appreciated with reference to conductivity image log 76 that was made with depth estimator 54 in comparison with image logs 78 and 80 for the same depth that were made without depth estimator 54.

Image log 76 represents a display of the conductivity image of a portion of the borehole wall as detected with an array of survey electrodes 32. The image log 76 of FIG. 1 is obtained with an image log generator 82 as more particularly described and incorporated herein by reference thereto in a copending patent application entitled "Method And Apparatus For Producing An Image Of An Earth Formation Penetrated By A Borehole" and filed by Ekstrom et al on the same date as this application and assigned to the same assignee as of this patent application. Darker regions on image logs 76, 78, 80 represent higher conductivities than lighter regions.

Image log 80 was made by displaying conductivity values $C_i$ from the various electrodes 32 without any depth or speed correction so that the conductivity values $C_i$ were assumed to occur at the depth of the tool as indicated by the cable measurement from cable sensor 36. This assumption led to severe saw-tooth like artifacts such as shown at 80.1, 80.2 and 80.3 and in effect masking the multilayering features as found to exist as shown at 76.1 in log 76.

Image log 78 was made with a tool speed or depth correction technique using accelerometers to measure tool velocity and depth, but assuming that the cable depth y represented true tool depth at regular intervals. This resulted in the presence of ripple shaped artifacts as at 78.1 that still tended to mask the actual conductivity pattern as appears in image log 76 at 76.1. The pattern of the different sediment layers with its ripples as evident at 78.1 in log 78 may have interpretive significance. Since the actual sediment pattern as shown at 76.1 in log 76 does not show such ripple, the image log 78 cannot be relied upon at 78.1.

Figure 2:
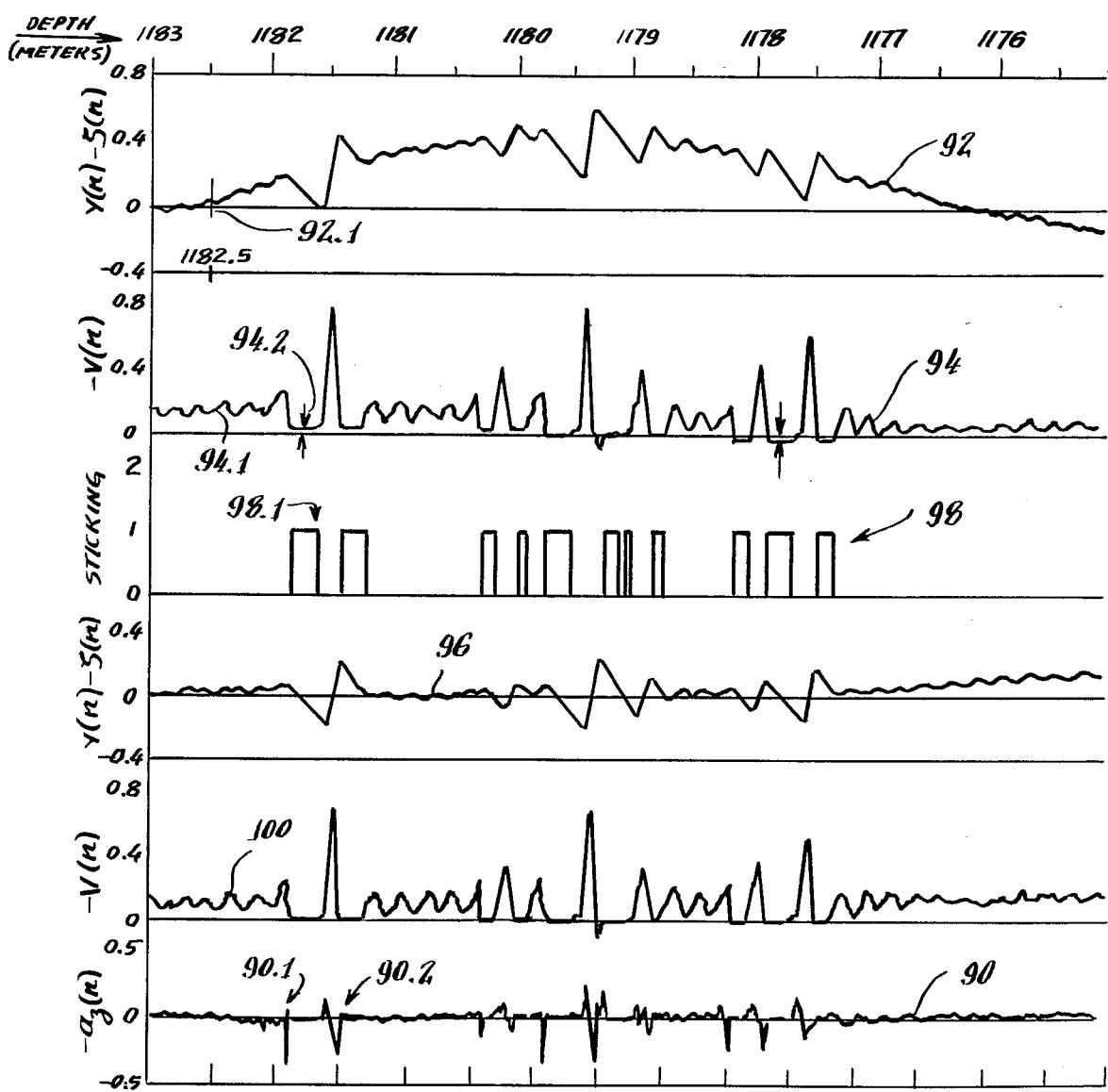
FIG. 2 is a log of depth related measurements made both in accordance with an earlier technique and in accordance with the invention.

The advantages of a tool depth estimator 54 in accordance with the invention can be particularly appreciated with reference to the line traces of FIG. 2. The line traces represent tool position and velocity measurements as a function of depth in meters for the borehole segment where severe tool sticking occurs. Trace 90 represents the z-axis (borehole axis) acceleration in units of $g = 9.81$ $m/sec^2$. Trace 92 represents the difference between the cable depth, y(n), and tool depth $\zeta(n)$, with the latter measured with the same technique as described with reference to the description of image log 78 in FIG. 1. Trace 94 is the velocity V(n) of tool 20 as measured with the latter technique.

Trace 96 represents the difference between cable depth y(n) and tool depth $\zeta(n)$ as measured with tool depth estimator 54 and trace 98 shows the intervals during which detector 68 has sensed a sticking of tool 20. Trace 100 represents the tool velocity V(n) as measured with tool depth estimator 54.

An error in the velocity estimate V(n) of trace 94 can be seen at 94.1 as an abrupt jump. This coincides with a segment boundary 92.1 at depth 1182.5, where the tool velocity is erroneously assumed to be equal to cable velocity. The assumed value for the initial velocity for the segment starting at depth 1182.5 introduces an error whose effect propagates well into the lesser depth segment following the boundary 92.1. For example, where the tool 20 is clearly stuck as indicated at 98.1, the velocity trace 94 should be zero at 94.2, when in fact it is considerably positive. Such error in the velocity estimate causes the accumlation of an error in the depth estimate which shows in trace 92 to considerably drift away from the cable depth y(n). In contrast, the tool depth estimate as evidenced by trace 96 illustrates a variation about the cable depth y(n) in a manner that would be expected when this represents the average tool depth over larger depth intervals. One particular advantage of the tool depth estimator 54 is its insensitivity to starting points and the absence of transient effects at the start of its operation. As a result, tool depth can be determined with a resolution comparable with the high resolution of the investigation of the earth formation, i.e. of the order of about 2.5 mm.

Tool depth estimator 54 employs a filter with which estimates of unknown quantities such as tool depth $\zeta$, can be made from noisy measurements such as borehole axis acceleration $a_z$ and cable depth y. The filter is a Kalman filter that is adapted in accordance with the invention to the borehole conditions.

Figure 3:
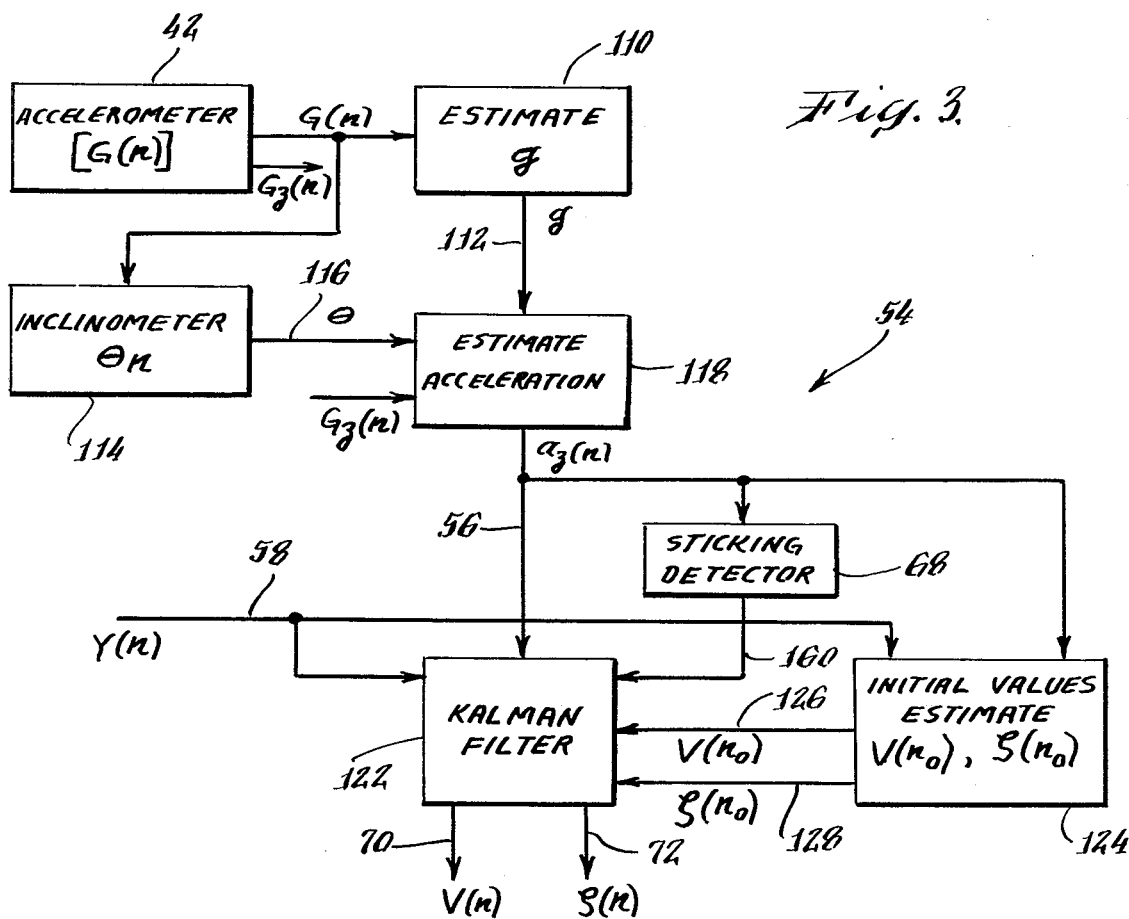
FIG. 3 is a block diagram of a tool depth sensor in accordance with the invention.

With reference to FIG. 3, a digital version of the tool depth sensor 54 is shown. Accelerometer data, G, from orthogonally oriented accelerometers 42 are processed at 110 to produce the local gravity constant g on output 112 and at 114 to generate a value of the inclination angle $\theta$ of the borehole 24 on output 116. These parameters, together with the measured acceleration, $G_z(n)$ along the borehole axis 40, are applied at 118 to estimate the acceleration $a_z(n)$ of tool 20 along the borehole axis 40.

In the use of the acceleration measurements derived from the accelerometers 42, an estimate is first made of gravity g by averaging all the orthogonal accelerometer values over all the available samples. Thus, a value tool is stuck and unity at other times and multiplying, such as at 214.1–214.6, the clamp signal 188 with those quantities that need to be set to zero while the tool is stuck.

Tool sticking detector 68 also generates a function signal f at 216 (FIG. 6) for use with a function generator 217 to produce improved values for the gain factors $K_1$ and $K_2$ to more accurately estimate tool velocity and tool depth shortly after the tool resumes movement after it was stuck.

The value of function signal f is represented by the shape of the curve 216 in FIG. 8 and shows an increasing function at a constant slope as a function of time with the ramp 216.1 while the tool is stuck from time $t_o$ to $t_1$. After the tool begins to move again, following time $t_1$, the value of f may be maintained, as represented by segment 216.2 for a time deemed sufficient to gradually adjust the filter 122 to the rapid oscillatory motions following sticking of the tool 20. The duration of segment 216.2 may, for example, be the same as the time tool 20 was stuck. At some time $t_2$ the value of f is forced to zero along a function curve such as segment 216.3. The segment 216.3 may follow a taper with the same slope as segment 216.1 or be changed along another function such as shown curved at 216.4 or with a steeper slope at 216.5.

The function value of f may also be decreased to zero along a function curve shown at 216.6 starting at time $t_1$ when tool 20 initially becomes unstuck. By employing the function f, the reliance of filter 122 on cable depth measurement y immediately after tool 20 has been stuck for some time, i.e. when the cable depth error at 145′ (see FIG. 7) is greatest, is reduced. As the function f is decreased after the tool has become unstuck, the influence of the cable measurement y on the tool depth measurement is gradually restored.

The discrete tool depth estimator version in FIGS. 6 and 7 follows the continuous version of FIG. 4 with regard to the Kalman filter part and for this reason equivalent discrete functions of FIG. 4 are shown with like but primed numerals in FIG. 7. Also, the discrete version is shown as presenting certain signals on outputs, though when it is executed inside a digital signal processor, the various values of signals will appear at particular times in a memory or other signal storage or signal determining registers. The execution of a digital Kalman version may be derived from known publications such as the aforementioned publication on optimal filtering by the M.I.T. Press.

The computations performed by the digital Kalman filter in FIG. 7 are done on sets of samples including samples of the cable depth y(n) and borehole axis (z axis) acceleration $a_z(n)$. The basic filter computations are for the error variance estimates for velocity $P_v$, depth, $P_\zeta$, covariance $P_{v\zeta}$, tool velocity V, and tool depth $\zeta$ using the following computations. Initial conditions are obtained by Kalman smoothing of acceleration and cable depth measurement over an initial distance which may be several meters long. The computations are repeated at each time interval T of index n with new values replacing old values and no need to save previously computed values. The equal signs mean that the function on the left of the sign is being set by the particular combination of values on the right.

| | |
|---|---|
| $P_v^- = P_v + T^2 q^2$ | Where $P_v^-$ = an intermediate velocity error variance estimate |
| | Where q = acceleration error standard deviation set equal to a constant value |
| $P_{v\zeta}^- = TP_v + P_{v\zeta} + \dfrac{T^3}{2} q^2$ | Where $P_{v\zeta}^-$ is an intermediate error covariance estimate |
| $P_\zeta^- = T^2 P_v + 2TP_{v\zeta} + P_\zeta + \dfrac{T^4}{4} q^2$ | Where $P_\zeta^-$ is an intermediate depth error variance estimate |
| $D = P_\zeta^- + (r + s)^2$ | Where r is the cable depth error standard deviation and s is an adaptation parameter employed when the tool is stuck and derived from $s = V_{nom} \times f$, with $V_{nom}$ being the average cable velocity and f is the function 216 |
| $R = (r + s)^2$ | |
| $K_1 = P_{v\zeta}^-/D$ | |
| $K_2 = P_\zeta^-/D$ | |
| $P_v = P_v^- - P_{v\zeta}^- K_1$ | |
| $P_{v\zeta} = P_{v\zeta}^- R/D$ | |
| $P_\zeta = P_\zeta^- R/D$ | |
| $V^- = V + Ta$ | Where $V^-$ is an intermediate tool velocity estimate; a is the tool acceleration estimate |
| $\zeta^- = TV + \zeta + T^2 a/2$ | Where $\zeta^-$ is an intermediate tool depth estimate |
| $z = y - \zeta^-$ | |
| $V = V^- + K_1 z$ | Where V is the final tool velocity estimate |
| $\zeta = \zeta^- + K_2 z$ | and $\zeta$ is the final tool depth estimate |

The values for q and r are chosen as nominal accelerometer and cable depth noise standard deviation values. The cable depth standard deviation r is set at a value which is for normal yo-yo type oscillations of tool 20 at the end of cable 22. The value for r is, therefore, made proportional to the length of the cable in the borehole. The execution of the above relationships is carried out for each set of samples of cable depth y and acceleration measurements.

Initial estimates of velocity, V and depth, $\zeta$, are made by using the Kalman filter 122 augmented by a smoothing operation to determine initial conditions using a preset number of indices. The discrete Kalman filter of FIGS. 6 and 7 implements the relationships as set forth above commencing with initial values obtained from a smoothing operation. Tool sticking detector 68 causes the generation of clamp signal 188 to have a value of zero, such as at 188.1, during sticking and unity at all other times. Hence, when the tool is stuck, the estimates of the velocity error variance $P_v$ and covariance $P_{v\zeta}$ are forced to zero with multipliers 214.4 and 214.5. In addition, the gain factors $K_1$ and $K_2$ are set to zero with multipliers 214.1 and 214.2, and the input of the acceleration measurement $a_z$, 56 to the integrator sections 140′ and 142′ and the velocity estimate V are clamped equal to zero at 214.6 and 214.3 respectively. Also, $P_\zeta^-$ is clamped at 214.7 and q at 214.8.

As a result, when tool 20 has been determined to be stuck, the value of the estimate of tool depth $\zeta$ is kept at a constant value. The cable depth standard deviation r is altered to reduce the reliance of the filter on cable depth measurement y immediately after the tool resumes movement after it was stuck with a function signal f, generated by tool sticking detector 68 as a function of the time the tool was stuck. This value of f is multiplied at 224 by the nominal velocity $V_{nom}$ of the cable to produce the parameter s.

FIG. 9 illustrates the tool sticking detector 68 with greater detail. At 240 an initializing of parameters is undertaken such as the resetting of values for the function f, clamp 188, a counter K and a window positioner n. The arrows at 240 indicate the values to which these parameters are set.

At 242 the value of the counter K is tested. K represents an index value to indicate when the tool is becoming unstuck after having been stuck.

At 170 a test is made whether the most recent velocity estimate V is less than a minimum threshold $\delta_o$. If so, then this is an indication that the tool may be stuck so that at 246 a window of a number, N, of future acceleration samples $a_z$ are selected and the mean value $m_s$ computed at 248 to commence the mean and variance tests 174. The mean value $m_s$ is compared to a threshold $\delta_1$ at 250 and if the mean is less than the threshold the tool sticking sensor is continued at 252 where the mean is removed from the window acceleration samples.

At 254 a status flag is tested as to whether the tool has been found to be stuck; if not, an index L is set at 256 to the index of the acceleration signal within the window that follows the first ring, such as 90.1 in FIG. 2. If the tool had been stuck, step 256 is bypassed with the test 258 and step 260, the latter of which decrements the index value L by one.

At 262 the variance of the acceleration signal values $S_i$ over the portion of the window following index L is compared to a threshold $\delta_2$. If less, then at 276 a test is made over a short window of M indices that is slid over the values of the longer window of N indices. Test 176 determines whether the average value of the acceleration values $S_i$ over this short window M, for all positions of this shorter window within the longer window N, is less than a threshold value. If so, the test is continued at 266 by examining the status flag as to whether the tool had been stuck. A one in this flag indicates the tool was not previously stuck and test 268 is next conducted.

At 268 the ring test 180 is commenced by first determining whether the window of acceleration signal values begins with a zero value or a zero crossover. If so, test 270 is done to determine whether the energy in an initial position of the short window M is greater than that for all other positions of the shorter window M in the larger window N. The initial energy value is determined for the short window when it is located at the start of the long window after the sample just prior to cross-over, but including the first crossover sample, $S_2$. If this initial energy is greater than or equal to the maximum energy of the acceleration values in the short window M as this is slid over the large windown, an initial ring is determined to be present. The presence of a ring indicates the start of a sticking of the tool and the process is continued at 276.

. Since at this time all sticking tests have been passed and tool 20 had not been previously found to be stuck, the clamp 188 is set to zero at 276 and the value of time counter $t_s$ set to zero at 278.

The counter value $t_s$ represents the duration tool 20 has been stuck and is used to generate the function f. The tool's stuck condition is stored at 280 by setting the value of the status flag to a value of one. The index value for n is incremented at 282 and the velocity and depth estimates made at 284 with the now modified filter in the manner as described with reference to FIGS. 6–8. The tool sticking detector is reentered at 242 and the process repeated until the tool becomes unstuck as determined by the failure of one of the tests.

During a subsequent pass through detector 68 with the tool still determined to be stuck, steps 256, 268,270, 273 and 278 are bypassed and the time counter $t_s$ incremented at 286. When any one of the tests has failed, a transfer is made to step 288. If the tool had previously been stuck, a counter K is set at 289 to the signal index in the window at or immediately following the last zero crossover. This value of K indicates the number of positions the window must be advanced before the start of the window reaches the index value for which the tool is determined to emerge from a stuck condition. This value of counter K is then used to rapidly circulate through routine 68 while decrementing K at each pass at 291.

When the value of K has been decremented to one, as determined by passing of test 290, the function f is set at 292 to the maximum of either the time counter $t_s$ or the previous value of the function f. The clamp 188 is reset to unity at 294. The choice between the two values for f at 292 is made to accommodate the situation where the tool becomes stuck again, such as shown at 188.2 in FIG. 8, before the compensation effect of the function f with its segments 216.2 and 216.3, see FIG. 8, has been completed. In such case the value of f is adjusted to the highest value at 292 to provide compensation that takes the most recent tool sticking into account. The value of f in such case is made to follow a curve such as 216.7 (see FIG. 8) for sticking condition 188.2 or curve 217.8 for a sticking condition such as 188.3.

Commencing at 296 in FIG. 9 the function f is forced along the curves as shown in FIG. 8 at 216.2 and 216.3 by first examining whether f is equal to zero at 298 in FIG. 9. If not, the value of time counter $t_s$ is examined at 299 for being zero and decremented at 300 by the time interval T between samples if greater than zero and this continued for subsequent passes through detector 68 after resetting the sticking status flag at 302. In this manner and as shown in FIG. 8, the value f remains at a constant level until time $t_2$, for a duration equal to the time tool 20 was stuck.

After time $t_2$, $t_s$ fails test 299 and after resetting the counter at 303, the value of function f as originally set at 292 is decremented at 304 and f is examined for its return to zero value at 306. In this manner the function f is driven along the portion 216.3 as shown in FIG. 8.

Having thus described a method and apparatus for precisely determining the depth of a tool in a borehole in accordance with the invention, variations from the embodiments may be made. For example, as shown in FIGS. 6 and 7, a down hole cable tension sensor 320 may be summed at 322 with the surface cable depth measurement to provide a more accurate cable depth measurement y. Such tension sensor is known and would be located near tool 20. The tension signal, when combined with the known elasticity constants of the cable 22, can cause a more precise operation of the Kalman filter 122. Other variations may be made without departing from the scope of the invention as defined by the following claims.

What is claimed is:

1. A method for determining the depth of a tool suspended from a cable inside a borehole penetrating an earth formation comprising the steps of:

deriving a measurement of cable depth of the tool from a measurement of the length of the cable from which the tool is suspended;

deriving a measurement of the acceleration of the tool along the borehole axis;

estimating the depth of the tool from the cable depth and acceleration measurements;

sensing a motionless tool in the borehole; and modifying the tool depth estimating step at least during the interval the tool is sensed to be motionless so as to maintain the tool depth estimate constant while the tool is motionless.

2. The method for determining the depth of a tool as claimed in claim 1 wherein the estimating step includes the step of integrating the acceleration measurement to derive a measurement of the velocity of the tool; and wherein the sensing step includes the step of sensing when the derived velocity of the tool is below a threshold level as an indication of a motionless tool.

3. The method for determining the depth of a tool as claimed in claim 2 wherein the sensing step further includes the step of determining when the flatness of the acceleration measurement is below a threshold level.

4. The method for determining the depth of a tool as claimed in claim 2 wherein the sensing step further includes determining when the mean of the acceleration measurement is below a threshold level.

5. The method for determining the depth of a tool as claimed in claim 4 wherein the sensing step further includes the step of determining when the variance of the acceleration measurement from the determined mean is below a threshold level.

6. The method for determining the depth of a tool as claimed in claim 5 wherein the sensing step further includes the step of scanning the acceleration measurement for the presence of a ringing response.

7. The method for determining the depth of a tool as claimed in claim 1 wherein the estimating step comprises the step of estimating the tool depth with a Kalman filter.

8. The method for determining the depth of a tool as claimed in claim 1 and further including the step of generating a modifier signal whose magnitude is a function of the duration that the tool is motionless and of the nominal cable velocity; and applying the modifier signal so as to initially reduce and then gradually return reliance by the depth estimate step upon the cable depth measurement following the interval the tool was motionless.

9. A method for determining the depth of a tool suspended from a cable inside a borehole penetrating an earth formation comprising the steps of:

deriving at a surface location a measurement of cable depth of the tool from a measurement of the length of the cable from which the tool is suspended;

deriving a measurement of the acceleration of the tool along the borehole axis;

estimating the depth of the tool from the cable depth and acceleration measurements with a Kalman filter, sensing a motionless tool; and modifying the tool depth estimating step at least during the interval the tool is sensed to be motionless so as to maintain the tool depth estimate constant while the tool is motionless.

10. The method for determining the depth of a tool as claimed in claim 9 and further including the steps of:

determining the elongation of the cable while the tool was motionless; and modifying the Kalman filter as a function of the determined cable elongation so as to initially reduce reliance by the Kalman filter upon the cable measurement after the tool resumes motion after a motionless interval and then gradually return normal reliance by the Kalman filter upon the cable measurement.

11. A method for determining the depth of a tool suspended from a cable inside a borehole penetrating an earth formation comprising the steps of:

generating a signal representative of the cable depth of the tool;

generating a signal representative of the acceleration of the tool along the borehole;

estimating the depth of the tool from the acceleration and cable depth signals with a Kalman filter;

sensing when the tool becomes stuck in the borehole; and maintaining the tool depth estimate constant while the tool is stuck.

12. The method for determining the depth of a tool in a borehole as claimed in claim 11 wherein said depth estimating step includes the step of:

modifying the cable depth measurement for a time after the tool becomes unstuck after it had been stuck so as to initially reduce and then gradually return normal reliance of the tool depth estimate step on the cable depth measurement.

13. The method for determining the depth of a tool in a borehole as claimed in claim 11 wherein said depth estimating step includes the steps of:

generating a modifying signal having a characteristic which is a function of the time the tool has been stuck; and applying the function signal to the depth estimating step so as to initially reduce its reliance upon the cable depth measurement after the tool becomes unstuck.

14. The method for determining the depth of a tool as claimed in claim 13 wherein said function generating step further includes:

generating the modifying signal with an amplitude that is a function of the time the tool has been stuck and the nominal cable velocity.

15. An apparatus for determining the depth of a tool suspended from a cable inside a borehole penetrating an earth formation comprising:

means located at the surface for generating a cable depth signal indicative of the length of cable from which the tool is suspended;

means for measuring the acceleration of the tool along the borehole axis and producing a signal representative thereof;

means responsive to the cable depth and acceleration signals for generating an estimate of the depth of the tool;

means for detecting a motionless tool and producing a signal indicative thereof; and means for modifying said estimate generating means with the latter signal to maintain the tool depth estimate constant while the tool is motionless.

16. The apparatus for determining the depth of a tool in a borehole as claimed in claim 15 wherein the means for detecting a motionless tool includes:

means for generating a signal representative of the velocity of the tool; and means for detecting from the acceleration signal when an amplitude excursion of a predetermined magnitude follows a predetermined minimum tool velocity level.

17. The apparatus for determining the depth of a tool in a borehole as claimed in claim 16 wherein the means for detecting a motionless tool further includes:
    means for detecting when the mean of the acceleration signal is below a threshold level; and
    means for detecting when the variance of the acceleration signal is below a threshold level.

18. The apparatus for determining the depth of a tool in a borehole as claimed in claim 15 wherein the means for generating the depth estimate further includes Kalman filter means.

19. The apparatus for determining the depth of a tool in a borehole as claimed in claim 15 wherein the modifying means further includes:
    means for producing a modifier signal with a value related to the product between the time the tool was motionless and a nominal cable velocity; and
    means for applying the modifier signal to the depth estimating means so as to initially reduce and then gradually return reliance by the depth estimating means upon the cable depth signal.

20. An apparatus for determining the depth of a tool suspended from a cable inside a borehole penetrating an earth formation comprising:
    means for generating a cable depth signal indicative of the length of the cable from which the tool is suspended;
    means for measuring the acceleration of the tool along the borehole axis and producing a signal indicative thereof;
    Kalman filter means responsive to the cable depth and acceleration signals for generating an estimate of the depth of the tool;
    means for detecting a motionless tool and producing a signal indicative thereof; and
    means for applying the latter signal to the Kalman filter means to maintain its tool depth estimate constant while the tool is motionless.

21. The apparatus as claimed in claim 20 and further including:
    means for producing a modifier signal that is a function of the elongation of the cable while the tool was motionless; and
    means for applying the modifier signal to the Kalman filter means so as to initially reduce and then gradually return reliance by the Kalman filter means upon the cable depth signal following the time the tool was motionless.

* * * * *